United States Patent
Meijer et al.

(10) Patent No.: US 10,261,845 B2
(45) Date of Patent: *Apr. 16, 2019

(54) TRANSPARENT INTEGRATION OF APPLICATION COMPONENTS

(71) Applicant: MICROSOFT TECHNOLOGY LICENSING, LLC, Redmond, WA (US)

(72) Inventors: Henricus Johannes Maria Meijer, Mercer Island, WA (US); Jeffrey Van Gogh, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/709,164

(22) Filed: Sep. 19, 2017

(65) Prior Publication Data

US 2018/0024872 A1    Jan. 25, 2018

Related U.S. Application Data

(63) Continuation of application No. 15/277,228, filed on Sep. 27, 2016, now Pat. No. 9,766,956, which is a continuation of application No. 12/042,034, filed on Mar. 4, 2008, now Pat. No. 9,454,410.

(51) Int. Cl.
    *G06F 9/54*    (2006.01)
    *G06F 9/44*    (2018.01)
    *G06F 9/448*   (2018.01)

(52) U.S. Cl.
    CPC ............ *G06F 9/541* (2013.01); *G06F 9/4484* (2018.02); *G06F 9/547* (2013.01)

(58) Field of Classification Search
    None
    See application file for complete search history.

(56) References Cited

U.S. PATENT DOCUMENTS

| | | | |
|---|---|---|---|
| 6,266,681 B1 | 7/2001 | Guthrie | |
| 6,678,715 B1* | 1/2004 | Ando | G06F 9/4862 709/201 |
| 7,111,048 B2 | 9/2006 | Hewett et al. | |
| 7,200,681 B1 | 4/2007 | Lewin et al. | |
| 9,454,410 B2 | 9/2016 | Meijer et al. | |
| 9,766,956 B2* | 9/2017 | Meijer | G06F 9/541 |
| 2002/0175940 A1 | 11/2002 | Lection et al. | |
| 2004/0088713 A1 | 5/2004 | Myllymaki et al. | |
| 2006/0036570 A1 | 2/2006 | Schaefer et al. | |
| 2006/0064674 A1 | 3/2006 | Olson et al. | |
| 2006/0069878 A1 | 3/2006 | Aguilar et al. | |

(Continued)

OTHER PUBLICATIONS

"Final Office Action Issued in U.S. Appl. No. 12/042,034", dated Feb. 10, 2012, 23 Pages.

(Continued)

*Primary Examiner* — Umut Onat
(74) *Attorney, Agent, or Firm* — Workman Nydegger

(57) ABSTRACT

Differing implementations associated with components of dissimilar execution environments are mediated to facilitate component integration. A host is provided to facilitate native interaction with foreign components by translating between native and foreign communications. Policies can be specified by either or both of a native and foreign component that control interaction.

20 Claims, 10 Drawing Sheets

(56) References Cited

U.S. PATENT DOCUMENTS

| | | | |
|---|---|---|---|
| 2006/0090173 | A1 | 4/2006 | Anderson et al. |
| 2006/0206856 | A1 | 9/2006 | Breeden et al. |
| 2006/0256739 | A1 | 11/2006 | Seier et al. |
| 2006/0271537 | A1 | 11/2006 | Chandrasekharan et al. |
| 2006/0294199 | A1 | 12/2006 | Bertholf |
| 2007/0016948 | A1 | 1/2007 | Dubrovsky et al. |
| 2007/0130152 | A1 | 6/2007 | Kosov et al. |
| 2007/0136417 | A1 | 6/2007 | Kreiner et al. |
| 2007/0136579 | A1 | 6/2007 | Levy et al. |
| 2007/0256055 | A1 | 11/2007 | Herscu |
| 2007/0283324 | A1 | 12/2007 | Geisinger |
| 2008/0028416 | A1 | 1/2008 | Gill et al. |
| 2009/0006523 | A1 | 1/2009 | Kordun et al. |

OTHER PUBLICATIONS

"Final Office Action Issued in U.S. Appl. No. 12/042,034", dated Nov. 26, 2013, 27 Pages.

"Final Office Action Issued in U.S. Appl. No. 12/042,034", dated Jun. 18, 2015, 31 Pages.

"Non Final Office Action Issued in U.S. Appl. No. 12/042,034", dated Jan. 21, 2016, 34 Pages.

"Non Final Office Action Issued in U.S. Appl. No. 12/042,034", dated Aug. 28, 2014, 28 Pages.

"Non Final Office Action Issued in U.S. Appl. No. 12/042,034", dated May 15, 2013, 22 Pages.

"Non Final Office Action Issued in U.S. Appl. No. 12/042,034", dated Jun. 29, 2011, 19 Pages.

"Notice of Allowance Issued in U.S. Appl. No. 12/042,034", dated Jul. 28, 2016, 17 Pages.

"Non Final Office Action Issued in U.S. Appl. No. 15/277,228", dated Dec. 1, 2016, 28 Pages.

"Notice of Allowance Issued in U.S. Appl. No. 15/277,228", dated May 23, 2017, 19 Pages.

Allaire, Jeremy, "Macromedia MX: Components and Web Services", In White Paper-Macromedia, Apr. 2002, 18 Pages.

Kadri, et al., "Building the Presentation-Tier of Rich Web Applications with Hierarchical Components", In Proceedings of the 8th International Conference on Web Information Systems Engineering, Dec. 2007, 12 Pages.

Petricek, et al., "AFax: Rich Client/Server Web Applications in F#", Retrieved from <<http://web.archive.org/web/20100612201656/http://tomasp.net/fswebtools/files/fswebtoolkit-ml.pdf>>, Retrieved Date: Dec. 11, 2007, 12 Pages.

* cited by examiner

TRANSPARENT INTEGRATION OF APPLICATION COMPONENTS

CROSS-REFERENCE TO RELATED APPLICATIONS

This application is a Continuation from and claims priority to and benefit of U.S. patent application Ser. No. 15/277,228, entitled "TRANSPARENT INTEGRATION OF APPLICATION COMPONENTS, which was filed Sep. 27, 2016, and which is to issue on Sep. 19, 2017, as U.S. Pat. No. 9,766,956. U.S. patent application Ser. No. 15/277,228, in turn, claims priority to U.S. patent application Ser. No. 12/042,034, entitled "TRANSPARENT INTEGRATION OF APPLICATION COMPONENTS," which was filed on Mar. 4, 2008, and which issued as U.S. Pat. No. 9,454,410 on Sep. 27, 2016. Each of U.S. patent application Ser. No. 15/277,228 and Ser. No. 12/042,034 are expressly incorporated herein in it their entirety.

BACKGROUND

Application software provides users with specific useful functionality. Computers and other processor-based devices provide hardware that is harnessed by applications to affect such functionality. Accordingly, application software converts computers into specialized machines that perform tasks prescribed by the application. Some applications have tight links to processing machines. Conventional client applications, for instance, are tied to particular computing platforms or hardware architectures. For example, applications designed for platform "X" are not executable on platform "Y" and vice versa. Furthermore, if it is desirous to employ an application on another machine even of the same platform it needs to be installed thereon.

With the advent of the Internet and World Wide Web ("web"), informational access became much less platform dependent. The Internet provides a publically accessible interconnected network of computers. The web is a collection of documents that are available via the Internet. Web browsers are applications that provide a portal to the Internet and collections of accessible information in the form of websites. While browsers themselves are platform dependent the information and presentation thereof is platform independent. Accordingly, individuals employing disparate machines can all view the same websites.

The web is continually evolving into a much richer computing environment. For the most part, early versions of the web enabled users to do little more than retrieve published information. Today's version, referred to by some as "Web 2.0," provides a much more interactive experience. Among other things, the network itself is now an application platform. Users are thus able to execute and interact with software applications entirely within web browsers replacing actual machine dependency with virtual machine dependency (e.g., Java™ Virtual Machine (JVM), Common Language Runtime (CLR) . . . ), for instance.

Furthermore, participation is encouraged in the evolving web. Rather than simply being a receiver of information of a particular form, users are encouraged to contribute to network content and are able to control how information is provided to them. For example, in addition to those provided by companies, individuals author reusable application components or small programs such as widgets or gadgets that provide an interface for data interaction. Users can then select and employ one or more of these components (e.g., stock ticker, weather, web feeds . . . ) for use on a desktop or within a browser (e.g. my pages).

SUMMARY

The following presents a simplified summary in order to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure pertains to transparent integration of application components. In accordance with one aspect of the disclosure, a mechanism is provided to mediate differences between application communications and/or protocols to facilitate interaction. According to another aspect of the disclosure, this transformation/translation mechanism is employed in conjunction with a marshalling mechanism to facilitate hosting of foreign application components that vary not only in execution context but also in implementation from native components. Among other things, this enables arbitrary integration as well as nesting of application components with minimal developer effort.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Systems and methods pertaining to integration of application components are described in detail hereinafter. Translation is performed to mediate differences between multiple application components associated with different execution environments or different versions of the same environment. This translation mechanism can be employed by a host to facilitate transparent integration of application components. For example, foreign application interface calls can be exposed as native application calls and vice versa. In other words, the host makes foreign calls look like native calls on both sides. Policies can also be set in place to control actions of application components in relation to one another.

Various aspects of the subject disclosure are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
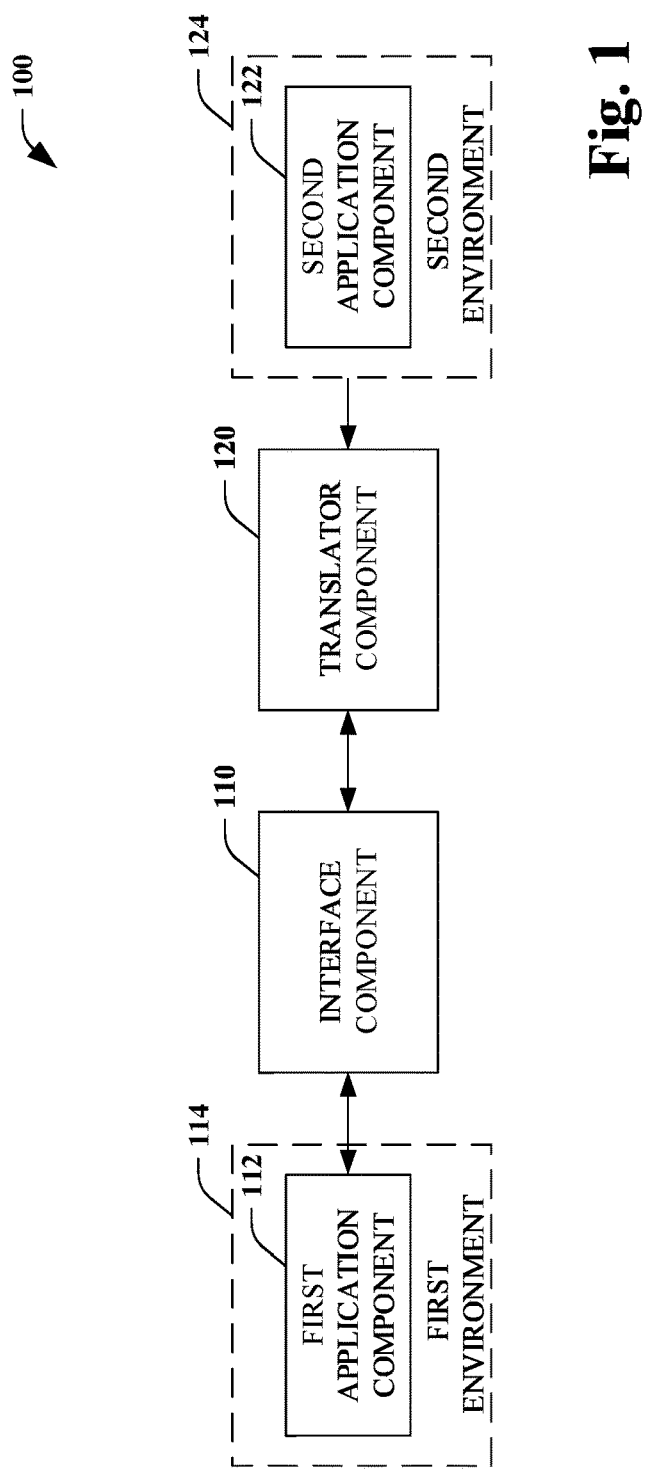
FIG. 1 is a block diagram of an application translation system in accordance with an aspect of the disclosure.

Referring initially to FIG. 1, an application translation system 100 is illustrated in accordance with an aspect of the disclosed subject matter. Interface component 110 receives, retrieves, or otherwise acquires communications including calls, messages, events, and the like from a first application component 112. The application component 112 can be any software application that is executable by a first execution environment, platform, framework, or context 114. For example, the execution context can correspond to a particular machine, an operating system, or a virtual machine, among other things. The communications of the first application component 112 can be provided via a corresponding application-programming interface (API), among other things. Upon acquisition, the interface component 110 can transmit the communications or calls to the translator component 120 or otherwise make them available thereto.

The translator component 120 translates or transforms communications from a first to a second protocol, format, or the like. For example, it can map a call to an equivalent call in an alternate implementation. Here, the translator component 120 translates communications from the first application component 112 to equivalent communications for a second application component 122. The second application component 122 can be any application executable by a second execution environment, platform, framework or context 124, similar the first application component 112. However, the first and second application 112 and 122, respectively, are different. Likewise, the first and second environments 114 and 124 are different environments or different versions of the same environment. Stated differently, the translator component 120 mediates between different API level communications of the first application component 112 and the second application component 122, where the components are executable by different execution environments or different versions of the same environments.

Figure 2:
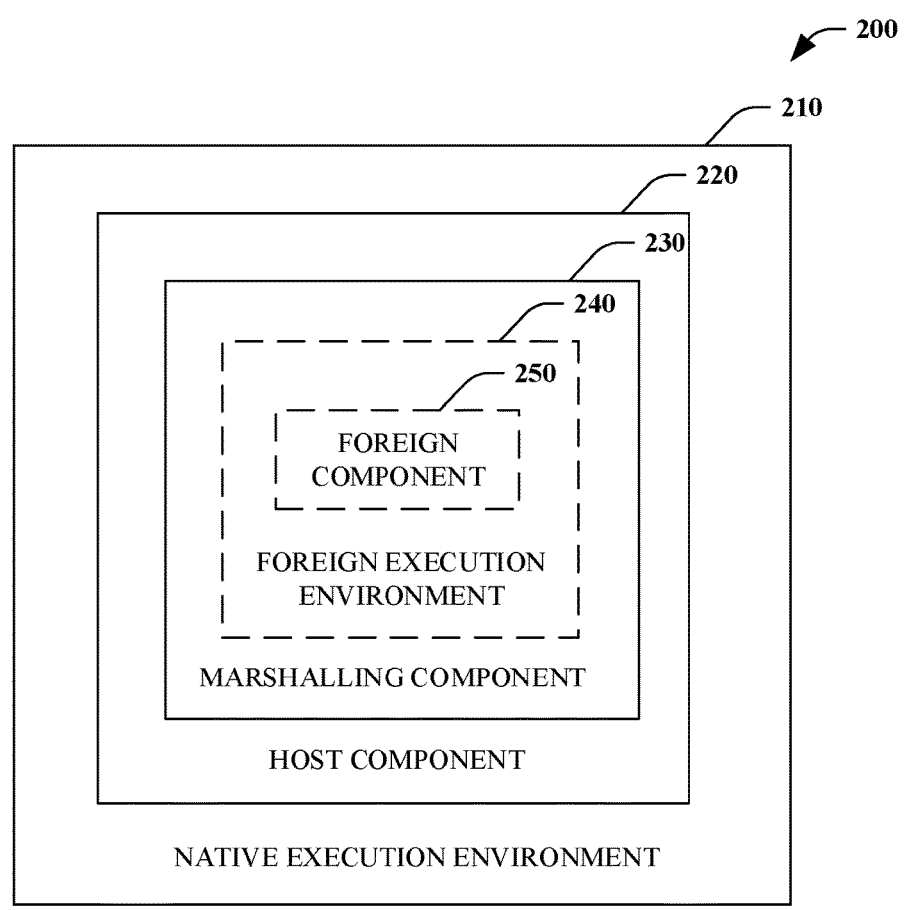
FIG. 2 is a block diagram of an integrated application system according to an aspect of the disclosure.

Turning attention to FIG. 2, an integrated application system 200 is depicted in accordance with an aspect of the claimed subject matter. The system 200 includes a native execution environment or context 210 corresponding to an operating system or a virtual machine (e.g., JVM, CLR . . . ), amongst others. The native execution environment 210 includes host component 220 that facilitates hosting of a foreign application component 250 within the environment 210 and/or an associated application (not shown). In other words, the host acts as an interface between the native execution environment 210 and/or supported applications and the foreign application component 250.

As illustrated, the host component 220 can employ a marshalling component 230 to enable cross-environment communication between the native execution environment 210 and a foreign execution environment 240. For example, the marshalling component 230 can maintain caches between the two environments to ensure object identity and initiate or perform serialization. Further yet, it is to be noted that since data types between the environments can be different the marshalling component 230 can cast parameters to their correct data type when exchanging between execution environments. In this manner, the marshalling component 230 affords an execution environment bridge and the host component 220 mediates specific communications such as events, messages, or API calls between the native execution environment 210 and/or a supported application and the foreign application component 250.

Consider web application components with a visual representation or controls, for instance. The web offers many reusable web components to web developers. An example of this is a mapping control that comes with a full software development kit (SDK) that makes it easy for developers to reuse the mapping technology to display information relevant to their website. Further, many companies release reusable web components in their field of expertise such as social bookmarking components (e.g., Facebook™), and auction tracking components (e.g., eBay™), among others. Since these components rely on web standards (e.g., HTML, JavaScript™ . . . ), whereas client applications usually employ higher-level/more structured languages (e.g., C#, VB, Java™ . . . ), there is a disconnect. Thus, integration of such web components into rich client applications can be challenging.

To understand the difficulties further, consider a specific client implementation, such as the .NET framework. The current framework provides a mechanism, through a "WebBrowser" class, to host a browser window inside a rich client application. While the mechanism makes it easy to show a certain webpage inside a rich client application, it does not make it easy for a developer to have the application code interact with a JavaScript™ API inside the webpage. The only way for a developer to communicate from a client application to the JavaScript™ API is by injecting JavaScript™ into the HTML page. This turns out to be difficult as it is not exposed in the class, but only by peeking into the underlying COM interface, as follows:
var nativeWindow=(IHTMLWindow2) webBrowser1.Document.Window;
nativeWindow.execScript(<code>, "JSCRIPT");
However, the COM interface wrapper "IHTMLWindow2" is very undiscoverable and the property "Window" is typed as a "System.Object," leaving developers guessing how it can be used.

For people who figure out how to access this underlying call a number of additional hurdles are waiting for them. First, the developer now requires knowledge of JavaScript™. Second, the developer needs to write complicated glue code in a client framework that generates JavaScript™ code to inject into a page, which is quite complicated to test. Further, this pattern only allows relatively simple JavaScript™ calls to be made. For example, use of asynchronous patterns by application components where the component will execute a certain task (possibly running on the remote server) and then invoke a callback (JavaScript™) function is not possible with such a browser call. Since this pattern only allows injection of JavaScript™ into the browser, by passing a string, there is no easy way to receive callbacks. More advanced techniques could be employed by developers such as by providing an "Object- ForScripting," but this burdens a developer even further as it requires knowledge of the COM programming model.

These and other hurdles make it extremely difficult for application developers to reuse web components. This issue is addressed by the subject disclosure by exposing web components to a client development framework in the same way as other native components. The host component 220 can then manage interactions to ensure proper code injection and the like. As a result, developer burden is substantially curtailed since developers need not learn JavaScript™ and write glue code.

Figure 3:
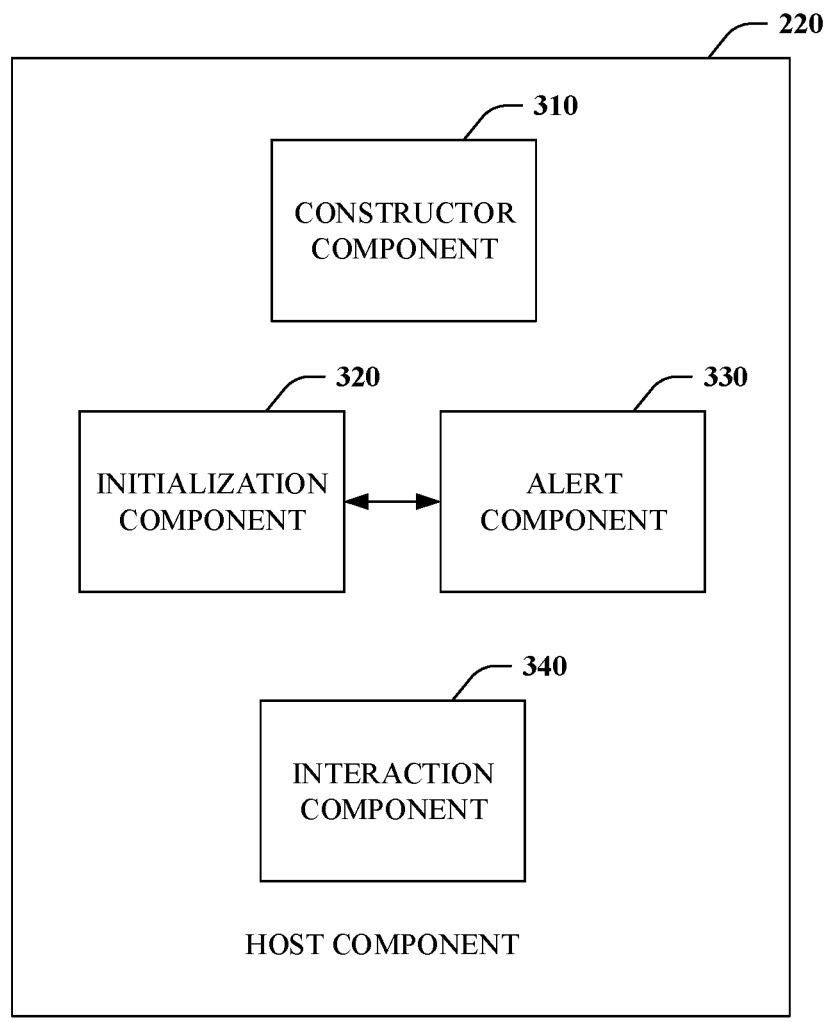
FIG. 3 is a block diagram of a representative host component according to a disclosed aspect.

FIG. 3 illustrates a representative host component 220 in accordance with a claimed aspect of the subject matter. As shown the host component 220 includes a constructor component 310 to construct or produce a host or instance thereof. A standard host can be constructed for all occasions or a more specific host can be produced for particular hosted application components and/or associated execution engines, platforms or frameworks.

Initialization component 320 can be employed by the host component 220 to spawn a foreign execution environment as well as initialize an application component to be hosted. Moreover, the initialization component 320 can establish a communication link between differing execution environments via a marshalling component, for instance. Alert component 330 can cooperate with initialization. In particular, where asynchronous spawning of an execution environment is desired, the component 330 can provide an alert or notification when the environment has been loaded.

Interaction component 340 controls interaction between a native execution environment and associated applications and a foreign application in both directions. In other words, the interaction component 340 can mediate protocol differences amongst the environment and a hosted application component.

Figure 4:
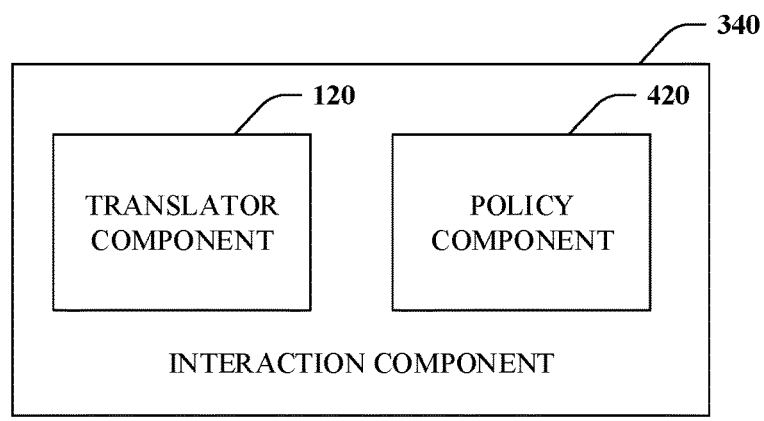
FIG. 4 is a block diagram of a representative interaction component in accordance with an aspect of the disclosure.

FIG. 4 illustrates representative interaction component 340 according to an aspect of the claimed subject matter. The interaction component 340 can employ the translator component 120 (or alternatively transformation system 100) of FIG. 1, as previously described, to mediate protocol differences. By way of example, consider two execution contexts "A" and "B" both of which support controls, gadgets, or widgets in their respective environments. In addition to differing execution contexts, controls in those environments can differ significantly in implementation. The translator component 120 can transform calls, messages, events, or other communications from a first protocol of a control supported by a context "A" and a second protocol of a control supported by context "B." For instance, some execution engines support events while others do not. Thus, where a control that does not support events or event handlers is hosted in an environment by application that does, the translator component 120 can pass or inject code that encapsulates events to the hosted application, for example using attribute based metadata on APIs to describe code to be generated. In another instance, display count or offset in one application may be determined from the top of a window including the title bar, whereas in another application the title bar is not counted for the width and height of a window. In this case, the translator component 120 will compensate for this difference. Among other things, the translator component 120 enables native-hosting and foreign-hosted applications to operate without knowledge of one another.

The interaction component 340 can also include a policy component 420 that controls interactions as a function of one or more policies. In one instance, a hosting environment or associated application can include polices that limit actions of hosted framework and/or application. Consider, for example, an email application that employs a hosted mapping application such that contact locations can be displayed on a map. A policy can be specified by the application or environment as to what operations, resources or the like are available to the hosted application and/or what are not. The policy component 420 can enforce such permissions and restrictions by monitoring and/or controlling interactions. This provides a layer of security to ensure that hosting environments or applications are not compromised by hosted applications. Of course, the hosted applications can also include policies that are enforced by the policy component 420.

The following exemplary code and description details one particular embodiment of a few aspects of the host component 220 in accordance with the claimed subject matter. It is to be appreciated that the following is provided solely to facilitate clarity and understanding and is not meant to limit the scope of the claimed subject matter in any way. In one implementation, the host component 220 can be embodied as a set of application programming interfaces (APIs) defined as follows in the context of web controls or application components with visual representations.

```
public class ComponentControlHost : UserControl
{
    public ComponentControlHost( );
    public ComponentControl Control { get; set;}
    public void Initialize<T>( ) where T : Control
    public void Initialize<T>(Func<T> callback) where T : Control
    public event EventHandler DocumentLoad;
}
```

As specified, the "ComponentControlHost" inherits from a native execution context construct "UserControl." "ComponentControlHost( )" is a contructor that contructs a new instance of the control host. This instance can be passed by a developer to an existing framework. "ComponentControl Control {get; set;}" is a property that a developer can employ to set and get a web component to be hosted inside a rich client application, for instance. The initialize functions are helper functions that allow a developer to automatically initialize a web component and associated environment that this control should host. Here, the first initialize function is synchronous while the second is asynchronous. Further yet, the functions are generic and assume that specifics of initialization for components can be determined or inferred as a function of a control type. Alternatively, a factory method or the like could be passed to the function to tell it how to create the control. "EventHandler" alerts a developer that a requested web component has been loaded and is ready for use.

A typical usage of this control can be as follows: First a user defines (or uses someone else's) "ComponentControl" that describes a foreign web component:

```
public partial class ComponentControl1 : ComponentControl
{
    public ComponentControl1( )
        : base("ComponentControl1.html")
    {
        InitializeComponent( );
        Map = new MapApp.Map( );
    }
    public MapApp.Map Map
    {
        get;
```

```
        private set;
    }
}
```

Next, the component can now be employed by an application within a particular framework or environment as follows:

```
public partial class Form1 : Form
{
    public Form1( )
    {
        InitializeComponent( );
        var controlHost = new ComponentControlHost( );
        Controls.Add(controlHost);
        controlHost.Initialize( );
        controlHost.Control.Map.Find("Redmond, WA");
    }
}
```

In this forms environment, it is assumed that a web browser is already exposed as a native control; otherwise, there would be some additional native calls here. What this code says is that first, an application component is initialized or created. Next, a new control host is created and added as a native control. Subsequently, the host loads a web browser with the map inside where Redmond, Wash. is displayed.

As illustrated by the example, integration of application components, even web components into rich client applications, is not only possible, but also easy to do. The host component 120 handles all the details behind the scenes so that the developer need not learn JavaScript™ or write complicated glue code. Further yet, interaction is two ways between a native and foreign application.

It is to be noted that aspects of this disclosure are fully compositional as well as symmetrical. For example, applications can be arbitrarily nested where a first application can host a second application that can host a third application, which can host a forth application, etc. Furthermore, there are no limitations regarding direction of hosting. For example, a Java™ application can be embedded within a .NET application or a .NET application can be embedded within a Java™ application.

Further yet, an arbitrary number of controls can be hosted. For instance, a client application can host two different web based mapping applications. Where an execution engine is common to more than one hosted application, several possibilities exist. In particular, the engine can be shared amongst a number of hosted applications and/or applications can have their own instance of the engine. This can be one of the things specified by a policy or preference and enforced by a system.

Still further, it is to be noted that aspects of the disclosure are applicable not only where different execution engines exist. Among other things, there is applicability where there are different versions of the same execution engines. Suppose, for instance, there is a change to an engine such that an old version or portions of the old version do not run in the newest version. In this case, such portions can be hosted by the new version utilizing the mechanisms described herein.

The aforementioned systems, architectures, and the like have been described with respect to interaction between several components. It should be appreciated that such systems and components can include those components or sub-components specified therein, some of the specified components or sub-components, and/or additional components according to various permutations and combinations of the foregoing. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components including those not specifically described herein for the sake of brevity, but known by those of skill in the art.

Furthermore, as will be appreciated, various portions of the disclosed systems above and methods below can include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, the translator component 120 can utilize such mechanisms to infer appropriate transformations given available contextual information.

In view of the exemplary systems described supra, methodologies that may be implemented in accordance with the disclosed subject matter will be better appreciated with reference to the flow charts of FIGS. 5-8. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Figure 5:
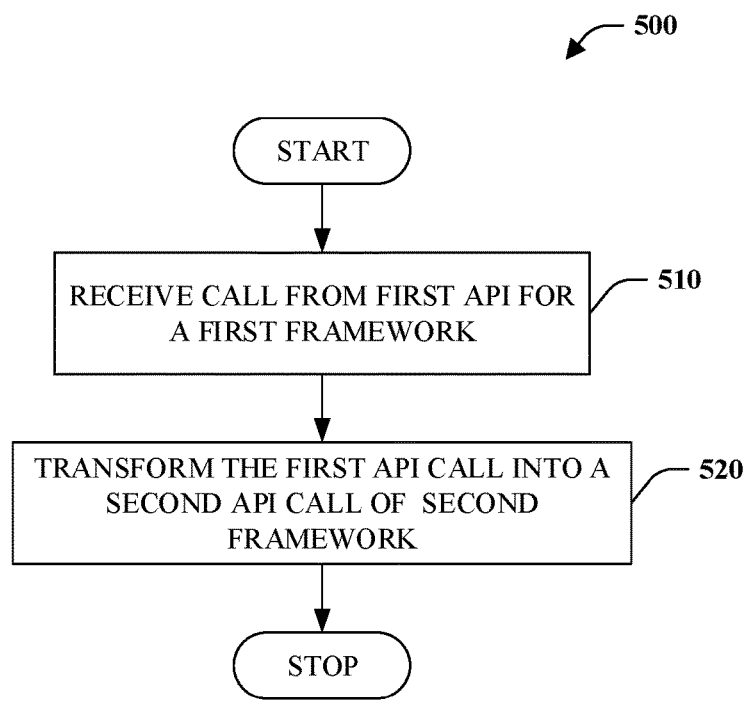
FIG. 5 is a flow chart diagram of a transformation method according to an aspect of the disclosure.

Referring to FIG. 5, a translation method 500 is illustrated in accordance with an aspect of the claimed subject matter. At reference numeral 510, a call, message, or event is received from an application-programming interface (API) from a first framework, environment, or the like. At numeral 520, communication from the first API is transformed or translated into an equivalent communication (e.g., call, message, event . . . ) for a second API of a second framework, environment, or the like. While transformation can correspond to a direct translation, more complicated transformations are also contemplated. By way of example, if a first API and related framework supports events and event handlers and the second API does not recognize events, the transformation can construct functions or the like that encapsulate events.

Figure 6:
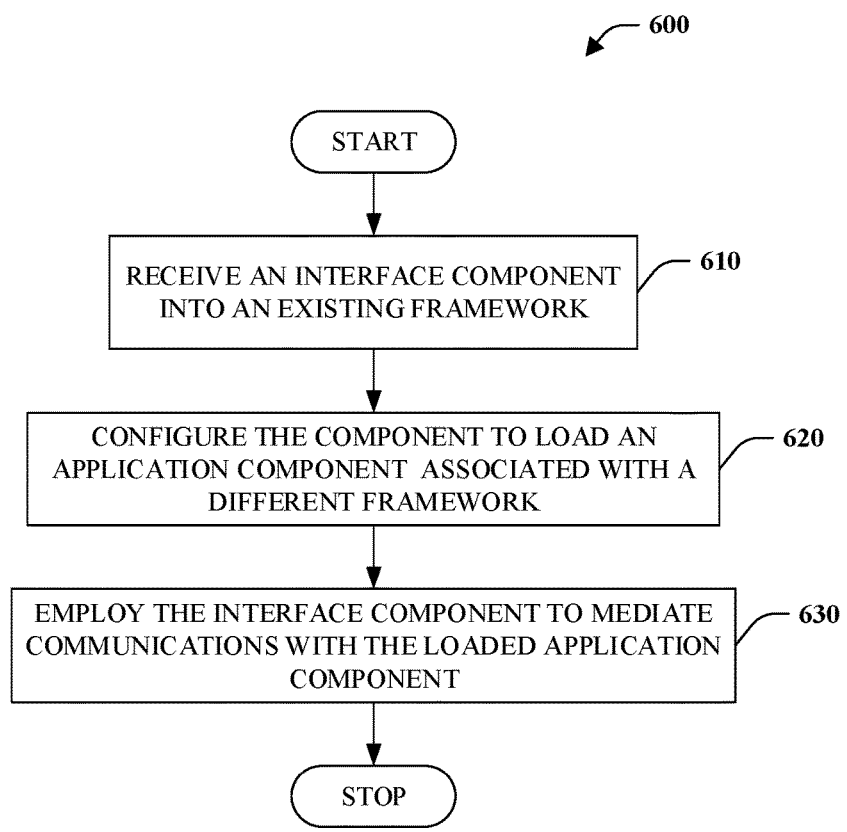
FIG. 6 is a flow chart diagram of a method of framework extension according to an aspect of the disclosed subject matter.

FIG. 6 depicts a framework extension method 600 in accordance with an aspect of the claimed subject matter. At reference numeral 610, an application framework, environment, or the like receives an interface component. For instance, a framework receives the component as an API plug-in that extends framework functionality. At reference 620, the interface component is configured to load and/or spawn an application component with different framework, environment or the like or a different version thereof. At reference numeral 630, the interface component is employed to mediate communications with the loaded application component. For example, calls to the application component in a native protocol can be transformed to calls to the application component and vice versa.

Figure 7:
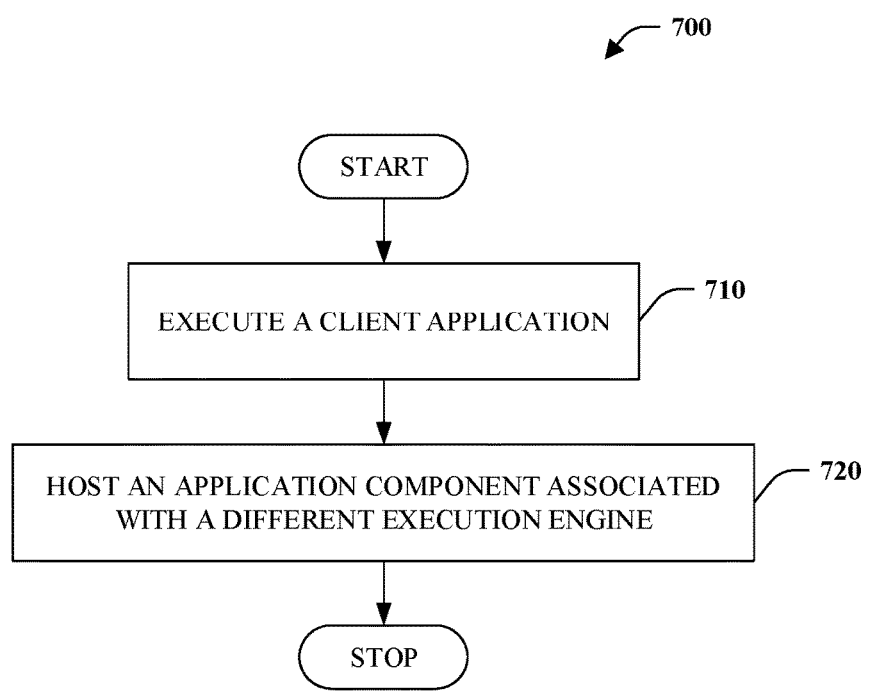
FIG. 7 is a flow chart diagram of a method of application interaction in accordance with a disclosed aspect.

FIG. 7 is a flow chart diagram of a method of application interaction 700 according to an aspect of the claimed subject matter. At reference numeral 710, an application, such as a rich client application, is executed. At numeral 720, the application hosts an application component associated with a different execution engine, framework, environment, or the like. For example, a web browser including an executable web application component can be loaded by a rich client application. Moreover, the hosting application and the application component communicate transparently. Stated differently, the hosting rich client application and hosted web application component can interact with each other utilizing native protocol without knowledge of each other. This can be accomplished utilizing a host or interface that that provides a translation layer such that the hosting application seems to be interacting with native application components or the like and the application components are unaware they are being hosted. For example, a hosted application component API can be exposed as a host application API and vice versa. In this manner, the integration gives the appearance that the applications are physically merged when in fact they are not.

Figure 8:
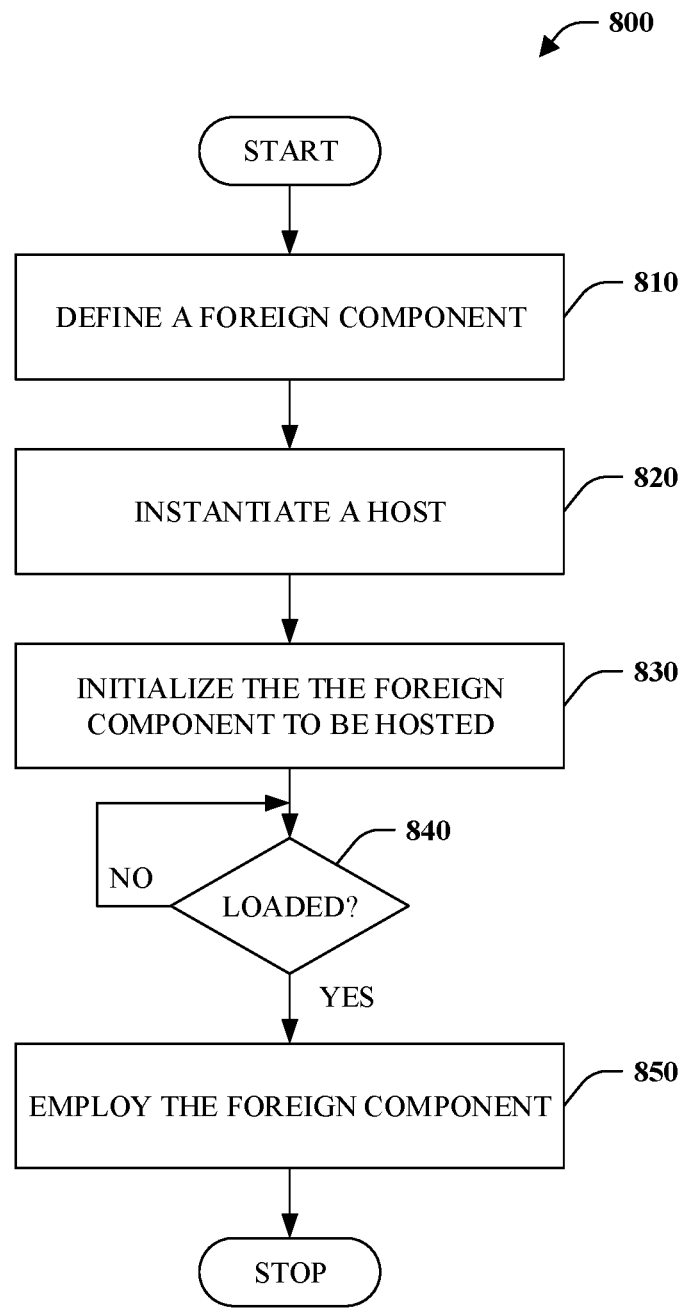
FIG. 8 is a flow chart diagram of an application hosting method according to an aspect of the disclosed subject matter.

Referring to FIG. 8, a method of application hosting 800 is depicted in accordance with an aspect of the claimed subject matter. At reference numeral 810, a foreign application component is defined. Alternatively, a previously defined foreign application component can be reused. At numeral 820, a host is instantiated. The host can correspond to a native application component that hosts the foreign application component. At reference 830, the foreign component to be hosted is initialized. Initialization can comprise setting up communication between a native and foreign execution engine, framework, environment, or the like, initiating loading of the foreign execution engine, and initiating execution of the foreign application component within its execution engine. At numeral 840, a determination is made as to whether loading of the foreign application component has completed. If no, more time is provided and the method continues to loop until loading is complete. Of course, the method can time out and generate an error after a predetermined period of time indicating that the component could not be loaded. Once loading is complete, the method continues at 850, where the foreign application component is employed.

As used herein, an execution environment, engine, framework, or the like refers to a context in which instructions are executed/interpreted to perform an action. Execution environments, can include, but are not limited to virtual machine environments, such as a Java™ Virtual Machine (JVM), Parrot, or the Common Language Runtime (CLR); native environments, such as native machine instructions; a component object model environment, such as COM and XPCOM; or a scripting environment, such as JavaScript™ or VBScript. One will appreciate that the execution environments can be context-dependent, such as treating scripting environments differently depending on where the scripts are executed (e.g., web browser vs. server-side vs. specific application software).

Often an execution environment will have one or more programming languages associated with it (e.g., Java™ with the Java™ Virtual Machine, or C# and Visual Basic on the Common Language Runtime) although some programming languages can be compiled/interpreted to result in code that operates in more than one execution environment (e.g., C++ to COM and native computer instructions). It is to be appreciated that different execution environments can refer to dissimilar types of execution environments (e.g., scripting and virtual machine environments) or can include different versions of the same execution environment.

Each execution environment can have one or more application programming interfaces (APIs) associated with it. These APIs can be part of the execution environment itself (e.g., named interfaces of a component object model) or APIs of a programming language associated with the execution environment.

The word "exemplary" or various forms thereof are used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner. It is to be appreciated that a myriad of additional or alternate examples of varying scope could have been presented, but have been omitted for purposes of brevity.

As used herein, the term "inference" or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject innovation.

Furthermore, all or portions of the subject innovation may be implemented as a method, apparatus or article of manufacture using standard programming and/or engineering techniques to produce software, firmware, hardware, or any combination thereof to control a computer to implement the disclosed innovation. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 9:
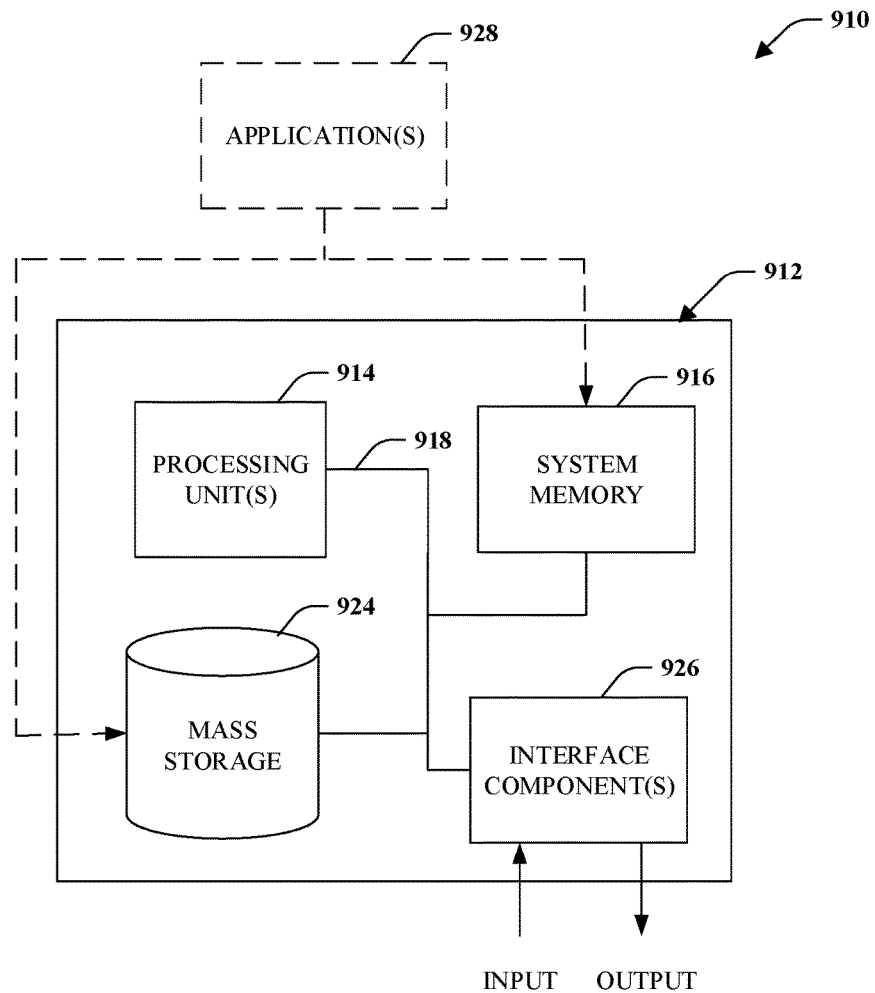
FIG. 9 is a schematic block diagram illustrating a suitable operating environment for aspects of the subject disclosure.
Figure 10:
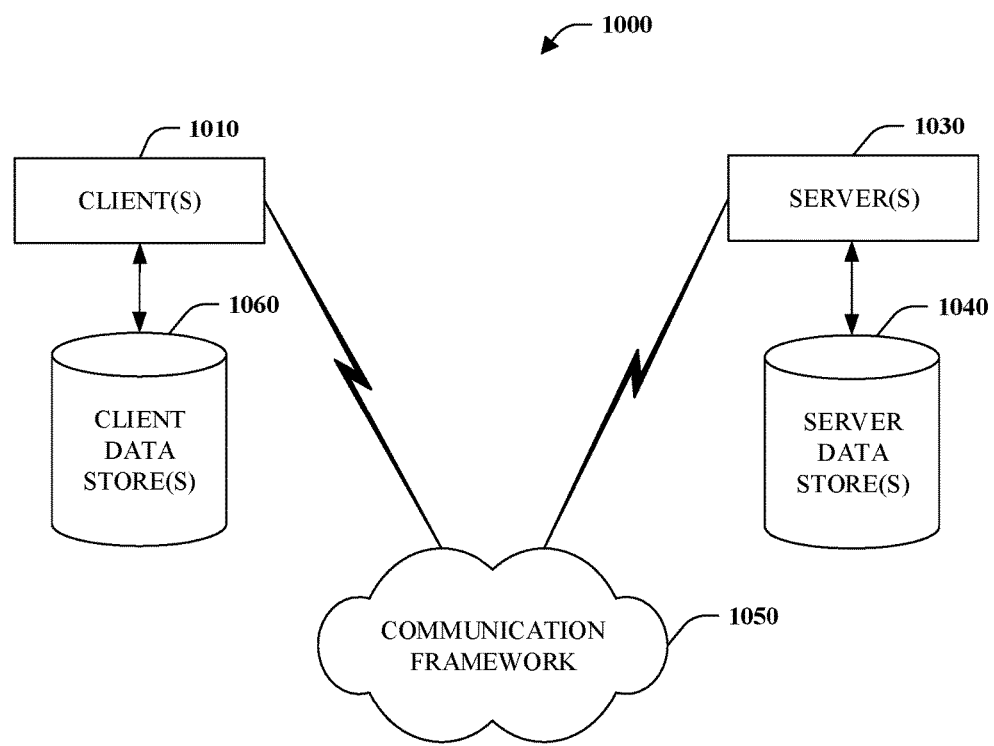
FIG. 10 is a schematic block diagram of a sample-computing environment.

In order to provide a context for the various aspects of the disclosed subject matter, FIGS. 9 and 10 as well as the following discussion are intended to provide a brief, general description of a suitable environment in which the various aspects of the disclosed subject matter may be implemented. While the subject matter has been described above in the general context of computer-executable instructions of a program that runs on one or more computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the systems/methods may be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed subject matter can be practiced on stand-alone computers. In a distributed computing environment, program modules may be located in both local and remote memory storage devices.

With reference to FIG. 9, an exemplary environment 910 for implementing various aspects disclosed herein includes a computer 912 (e.g., desktop, laptop, server, hand held, programmable consumer or industrial electronics . . . ). The computer 912 includes a processing unit 914, a system memory 916, and a system bus 918. The system bus 918 couples system components including, but not limited to, the system memory 916 to the processing unit 914. The processing unit 914 can be any of various available microprocessors. It is to be appreciated that dual microprocessors, multi-core and other multiprocessor architectures can be employed as the processing unit 914.

The system memory 916 includes volatile and nonvolatile memory. The basic input/output system (BIOS), containing the basic routines to transfer information between elements within the computer 912, such as during start-up, is stored in nonvolatile memory. By way of illustration, and not limitation, nonvolatile memory can include read only memory (ROM). Volatile memory includes random access memory (RAM), which can act as external cache memory to facilitate processing.

Computer 912 also includes removable/non-removable, volatile/nonvolatile computer storage media. FIG. 9 illustrates, for example, mass storage 924. Mass storage 924 includes, but is not limited to, devices like a magnetic or optical disk drive, floppy disk drive, flash memory, or memory stick. In addition, mass storage 924 can include storage media separately or in combination with other storage media.

FIG. 9 provides software application(s) 928 that act as an intermediary between users and/or other computers and the basic computer resources described in suitable operating environment 910. Such software application(s) 928 include one or both of system and application software. System software can include an operating system, which can be stored on mass storage 924, that acts to control and allocate resources of the computer system 912. Application software takes advantage of the management of resources by system software through program modules and data stored on either or both of system memory 916 and mass storage 924.

The computer 912 also includes one or more interface components 926 that are communicatively coupled to the bus 918 and facilitate interaction with the computer 912. By way of example, the interface component 926 can be a port (e.g., serial, parallel, PCMCIA, USB, FireWire . . . ) or an interface card (e.g., sound, video, network . . . ) or the like. The interface component 926 can receive input and provide output (wired or wirelessly). For instance, input can be received from devices including but not limited to, a pointing device such as a mouse, trackball, stylus, touch pad, keyboard, microphone, joystick, game pad, satellite dish, scanner, camera, other computer and the like. Output can also be supplied by the computer 912 to output device(s) via interface component 926. Output devices can include displays (e.g., CRT, LCD, plasma . . . ), speakers, printers and other computers, among other things.

FIG. 10 is a schematic block diagram of a sample-computing environment 1000 with which the subject innovation can interact. The system 1000 includes one or more client(s) 1010. The client(s) 1010 can be hardware and/or software (e.g., threads, processes, computing devices). The system 1000 also includes one or more server(s) 1030. Thus, system 1000 can correspond to a two-tier client server model or a multi-tier model (e.g., client, middle tier server, data server), amongst other models. The server(s) 1030 can also be hardware and/or software (e.g., threads, processes, computing devices). The servers 1030 can house threads to perform transformations by employing the aspects of the subject innovation, for example. One possible communication between a client 1010 and a server 1030 may be in the form of a data packet transmitted between two or more computer processes.

The system 1000 includes a communication framework 1050 that can be employed to facilitate communications between the client(s) 1010 and the server(s) 1030. The client(s) 1010 are operatively connected to one or more client data store(s) 1060 that can be employed to store information local to the client(s) 1010. Similarly, the server(s) 1030 are operatively connected to one or more server data store(s) 1040 that can be employed to store information local to the servers 1030.

Client/server interactions can be utilized with respect with respect to various aspects of the claimed subject matter. For instance, rich client applications can host web application components in one embodiment. Accordingly, a client 1010 can communicate with a server 1030 or other client 1010 across framework 1050 to acquire and/or interact with a remote web application such as a mapping application or weather widget, for instance. Further yet, web application components can host other web applications employing the framework 1050.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

What is claimed is:

1. A system, comprising one or more processors and computer-readable memory storing computer executable instructions which, when executed upon the one or more processors, configure the system to:
execute a first application component within a native execution environment having a first execution context, the first application component comprising code executable within the native execution environment;
instantiate a host corresponding to the first application component, the host providing a second execution environment within the first application component in which code of a second application component, executable within the second execution environment but not executable within the native execution environment, is enabled to run, the second execution environment being a different version of the native execution environment and having a second execution context distinct from the first execution context;
establishing a communication link between the native execution environment and the second execution environment using an interaction component in order to mediate application programming interface (API) calls between the native execution environment and the second execution environment and cast parameters to correct data types when exchanging between the native execution environment and the second execution environment; and
enable communication between the native execution environment and the second execution environment including translating calls and controls compatible with the native execution environment into calls and controls compatible with the second execution environment and translating calls and controls compatible with the second execution environment into calls and controls compatible with the native execution environment to compensate differences between the first execution context and the second execution context, such that the first application component can communicate with the second application component using native execution environment protocols and the second application component can communicate with the first application component using second execution environment protocols.

2. The system of claim 1, wherein the second execution environment is integrated within the native execution environment and calls to the second execution environment may be made using a first API between the native execution environment and the second execution environment.

3. The system of claim 2, wherein the system is further to construct the host for the second execution environment.

4. The system of claim 1, wherein the system is further to instantiate a web browser for a web application within the native execution environment, the web browser being executable within the second execution environment.

5. The system of claim 4, wherein the system is further to provide an alert when the web browser is fully loaded with the web application.

6. The system of claim 1, wherein the system is further to control communication as a function of a policy associated with the native execution environment or the second execution environment.

7. A computer-implemented method, the method comprising executing computer-executable instructions upon one or more computer processors to perform the following acts:
generating code in a first execution environment having a first execution context, the code generated based on code specified within the first execution environment using a first application programming interface (API) and the generated code executable in a second execution environment using a second API;
establishing a communication link between the first execution environment and the second execution environment using an interaction component in order to mediate application programming interface (API) calls between the first execution environment and the second execution environment, maintain caches between the first execution environment and the second execution environment, and cast parameters to correct data types when exchanging between the first execution environment and the second execution environment; and
communicating the generated code to an application component executing within the second execution environment by translating calls and controls compatible with the first API into calls and controls compatible with the second API and translating calls and controls compatible with the second API into calls and controls compatible with the first API to compensate differences between the first execution context and a second execution context of the second execution environment, the second execution environment corresponding to a web application executable by a web browser in the second execution environment using the second API.

8. The method of claim 7 further comprising loading of the web browser within the second execution environment.

9. The method of claim 8 further comprising loading of the web application after loading of the web browser completes successfully.

10. The method of claim 9 further comprising receiving a notification of complete and successful loading of the web application.

11. The method of claim 7, wherein communicating the generated code comprises constructing a call directed to the second application programming interface (API) that includes the generated code.

12. A computer-implemented method comprising:
executing computer-executable instructions on one or more processors to perform the following acts:
establishing, in a native execution framework having a first execution context, communication with a web browser component that provides an interface to control a web browser, the native execution framework using a first application programming interface (API);
loading, from the native execution framework through the web browser component, the web browser and a web application, the web browser and the web application executable in a second execution framework using a second API, the second execution framework having a second execution context the second execution context being a different version of the first execution context and distinct from the first execution context;
generating a first communication targeting the web application, the first communication using the first API based on the native execution framework, the API calls being mediated between the native execution framework and the second execution framework by maintaining caches between the native execution framework and the second execution framework and casting parameters to correct data types when exchanging between the native execution framework and the second execution framework, the first communication including calls and controls compatible with the first API;

translating the first communication in the native execution framework using the first API into a translated communication in the second API of the second execution framework to compensate differences between the first execution context and the second execution context, the translated communication including calls and controls compatible with the second API and is understandable to the web browser; and providing the translated communication to the web application.

13. The method of claim 12 further comprising injecting code into the web browser component to support translation of communication between the web application and the native execution framework.

14. The method of claim 12 further comprising injecting code that enables asynchronous interaction with the web application.

15. The method of claim 14 further comprising receiving an alert after the web browser and web application are loaded.

16. The method of claim 12 further comprising generating a second translated communication in a form supported by the native execution framework from a communication received from the web application in a form supported by the web application.

17. The method of claim 12, wherein generating the translated communication comprises producing code in a scripting language.

18. The method of claim 17 further comprising injecting the code into a web page.

19. The method of claim 12 further comprising controlling communication between the web application and the native execution framework based on one or more policies.

20. The method of claim 12, wherein translating includes generating code executable in the second execution context using the second API.

* * * * *